(12) United States Patent
Graves et al.

(10) Patent No.: US 11,112,765 B2
(45) Date of Patent: *Sep. 7, 2021

(54) SYSTEMS, METHODS, AND ARTICLES OF MANUFACTURE FOR OPERATION OF AN INDUSTRIAL MACHINE

(71) Applicant: Safe Tek, LLC, Monett, MO (US)

(72) Inventors: Michael Graves, Monett, MO (US); Joseph Graves, Granby, MO (US)

(73) Assignee: Safe Tek, LLC, Monett, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,044

(22) Filed: Sep. 17, 2019

(65) Prior Publication Data

US 2020/0012251 A1    Jan. 9, 2020

Related U.S. Application Data

(63) Continuation of application No. 15/473,214, filed on Mar. 29, 2017, now Pat. No. 10,416,646.

(Continued)

(51) Int. Cl.
 *G05B 19/27* (2006.01)
 *G05B 19/4061* (2006.01)
 (Continued)

(52) U.S. Cl.
 CPC ......... *G05B 19/27* (2013.01); *G05B 19/4061* (2013.01); *G05B 19/4063* (2013.01);
 (Continued)

(58) Field of Classification Search
 CPC ...... G05B 19/4061; G05B 19/27; G06T 7/90; G06T 7/50
 See application file for complete search history.

(56) References Cited

U.S. PATENT DOCUMENTS 4,412,268 A   10/1983   Dassow
5,341,036 A    8/1994   Wheeler
(Continued)

FOREIGN PATENT DOCUMENTS

EP   2685150 A1   1/2014

OTHER PUBLICATIONS

Weiss C.D.: "The Characterization and Properties of Cascade Realizable Switching Functions", IEEE Transaction on Computers, IEEE, USA, Jul. 1, 1969 (Jul. 1, 1969), pp. 624-633.

*Primary Examiner* — Mohammad Ali
*Assistant Examiner* — Vincent W Chang
(74) *Attorney, Agent, or Firm* — Armstrong Teasdale LLP

(57) ABSTRACT

A control system for operation of an industrial machine includes a processor and a tangible, non-transitory, computer-readable memory communicating with the processor. The tangible, non-transitory computer-readable memory includes instructions that, in response to execution by the processor, cause the processor to perform operations including: receiving image data from an imaging device that monitors an image zone around the industrial machine, and analyzing the image data. The processor further performs operations including determining, based upon the analyzing, that the control system is functional, determining, based upon the analyzing, that the image data includes at least one of a predefined color, a predefined pattern, and a predefined shape, and transmitting a proximity signal to at least one relay module coupled between the processor and the industrial machine to halt operation of the industrial machine.

15 Claims, 4 Drawing Sheets

Related U.S. Application Data

(60) Provisional application No. 62/420,902, filed on Nov. 11, 2016.

(51) Int. Cl.
  *G05B 19/4063* (2006.01)
  *G06T 7/50* (2017.01)
  *G06T 7/90* (2017.01)
  *H04L 29/08* (2006.01)

(52) U.S. Cl.
  CPC .................. *G06T 7/50* (2017.01); *G06T 7/90* (2017.01); *H04L 67/12* (2013.01); *G05B 2219/37631* (2013.01); *G05B 2219/39388* (2013.01); *G05B 2219/49152* (2013.01); *G06T 2207/10024* (2013.01); *G06T 2207/30196* (2013.01); *G06T 2207/30232* (2013.01)

(56) References Cited

U.S. PATENT DOCUMENTS

| | | | |
|---|---|---|---|
| 5,559,664 A | 9/1996 | Dogul | |
| 5,579,884 A | 12/1996 | Appleyard | |
| 5,619,183 A | 4/1997 | Ziegra | |
| 7,065,241 B2 | 6/2006 | Lehner | |
| 7,080,534 B2 | 7/2006 | Schneiderheinze | |
| 7,200,246 B2 | 4/2007 | Cofer et al. | |
| 7,281,403 B2 | 10/2007 | Sperrer | |
| 7,412,861 B2 | 8/2008 | Lohmann | |
| 7,448,241 B2 | 11/2008 | Davies | |
| 7,505,620 B2 | 3/2009 | Braune et al. | |
| 7,623,031 B2 | 11/2009 | Haberer et al. | |
| 7,924,164 B1 | 4/2011 | Staerzl | |
| 8,154,155 B2 | 4/2012 | Seidel et al. | |
| 2002/0061134 A1* | 5/2002 | Cofer | F16P 3/142 382/181 |
| 2004/0237617 A1 | 12/2004 | Sperrer | |
| 2006/0197020 A1 | 9/2006 | Trzecieski et al. | |
| 2007/0285222 A1 | 12/2007 | Zadnikar et al. | |
| 2010/0005982 A1 | 1/2010 | Veit | |
| 2010/0012821 A1 | 1/2010 | Hufnagel et al. | |
| 2011/0090040 A1* | 4/2011 | Allen | F16P 3/147 340/3.1 |
| 2011/0167970 A1 | 7/2011 | Niehsen et al. | |
| 2012/0081537 A1* | 4/2012 | Arcand | F16P 3/144 348/86 |
| 2013/0096799 A1 | 4/2013 | Horne et al. | |
| 2015/0063643 A1 | 3/2015 | Jackson et al. | |
| 2015/0262312 A1 | 9/2015 | Raanan | |
| 2016/0290559 A1* | 10/2016 | Nair | G05B 19/0425 |
| 2019/0049911 A1* | 2/2019 | Gregorius | G05B 19/048 |

\* cited by examiner

SYSTEMS, METHODS, AND ARTICLES OF MANUFACTURE FOR OPERATION OF AN INDUSTRIAL MACHINE

CROSS REFERENCE TO RELATED APPLICATIONS

This application is a continuation of U.S. patent application Ser. No. 15/473,214, filed Mar. 29, 2017, which claims the benefit of U.S. Provisional Patent Application No. 62/420,902 filed Nov. 11, 2016, the entire contents and disclosures of which are hereby incorporated herein by reference in their entirety.

BACKGROUND

The subject matter disclosed herein relates to systems, methods, and articles of manufacture for operation of an industrial machine and, more particularly, to systems, methods, and articles of manufacture for monitoring and controlling operation of a industrial machine in which an image zone is defined with respect to the industrial machine and in which the image zone is monitored for the presence of a predefined color, pattern, and/or shape.

Many known industrial machines include machining tools for bending, grinding, drilling, or otherwise working large objects, or workpieces, such as various metal and wooden objects. During operation, forces generated by these machines may cause a workpiece to shift or quickly move within and outside of the machine as it is manipulated, pressed, and formed. Sometimes this is referred to as a "whip up" or "whip down" of the workpiece during operation of the machine.

To protect the operator, many conventional industrial machines are equipped with safety systems. For instance, some industrial machines are equipped with operator arm restraint straps, which the operator dons during machine operation to maintain a safe distance from the machine. Other industrial machines require the implementation of safety procedures, such as procedures designed to hold the operator at a minimum safe distance from the machine during operation.

BRIEF DESCRIPTION

In one aspect, a control system for operation of an industrial machine is provided. The control system includes a processor and a tangible, non-transitory, computer-readable memory communicating with the processor. The tangible, non-transitory computer-readable memory includes instructions that, in response to execution by the processor, cause the processor to perform operations including: receiving image data from an imaging device that monitors an image zone around the industrial machine, and analyzing the image data. The processor further performs operations including determining, based upon the analyzing, that the control system is functional, determining, based upon the analyzing, that the image data includes at least one of a predefined color, a predefined pattern, and a predefined shape, and transmitting a proximity signal to at least one relay module coupled between the processor and the industrial machine to halt operation of the industrial machine.

In another aspect, a control system for operation of an industrial machine is provided. The control system includes a processor and a tangible, non-transitory, computer-readable memory communicating with the processor. The tangible, non-transitory computer-readable memory includes instructions that, in response to execution by the processor, cause the processor to perform operations including: receiving fault detection data from the control system, analyzing the fault detection data, and determining, based upon the analyzing, that the control system is functional. The processor further performs operations including transmitting a no fault found signal to at least one relay module of the plurality of relay modules to permit operation of the industrial machine.

In yet another aspect, a control system for operation of an industrial machine is provided. The control system includes a processor and a first relay module coupled to the processor, where the first relay module is configured to receive a proximity signal from the processor, and where the first relay module further configured to close in response to the proximity signal. The control system also includes a second relay module coupled to the first relay module and the processor, where the second relay module is configured to receive the proximity signal from the first relay module, and where the second relay module further configured to close in response to the proximity signal. The control system includes, in addition, a third relay module coupled to the processor and the industrial machine, where the third relay module is configured to receive a no fault found signal from the processor and a machine cycle permit in signal from the industrial machine, and where the third relay module further is configured to close in response to the no fault found signal. The control system also includes a fourth relay module coupled to the third relay module and the processor, where the fourth relay module is configured to receive the no fault found signal from the processor and the machine cycle permit in signal from the third relay module, and where the fourth relay module is configured to close in response to the no fault found signal and the machine cycle permit in signal.

In yet another aspect, a control system for operation of an industrial machine is provided. The control system includes a processor and a tangible, non-transitory, computer-readable memory communicating with the processor. The tangible, non-transitory computer-readable memory includes instructions that, in response to execution by the processor, cause the processor to perform operations including: receiving image data from an imaging device that monitors an image zone around the industrial machine, and analyzing the image data. The processor further performs operations including determining, based upon the analyzing, that the image data includes at least one of a predefined color, a predefined pattern, and a predefined shape, and transmitting a proximity signal to at least one relay module coupled between the processor and the industrial machine to halt operation of the industrial machine. The processor further performs operations including receiving fault detection data from the control system, analyzing the fault detection data, and determining, based upon the analyzing, that the control system is functional. The processor further performs operations including transmitting a no fault found signal to at least one relay module of the plurality of relay modules to permit operation of the industrial machine.

DRAWINGS

These and other features, aspects, and advantages of the present disclosure will become better understood when the following detailed description is read with reference to the accompanying drawings in which like characters represent like parts throughout the drawings, wherein.

Figure 1:
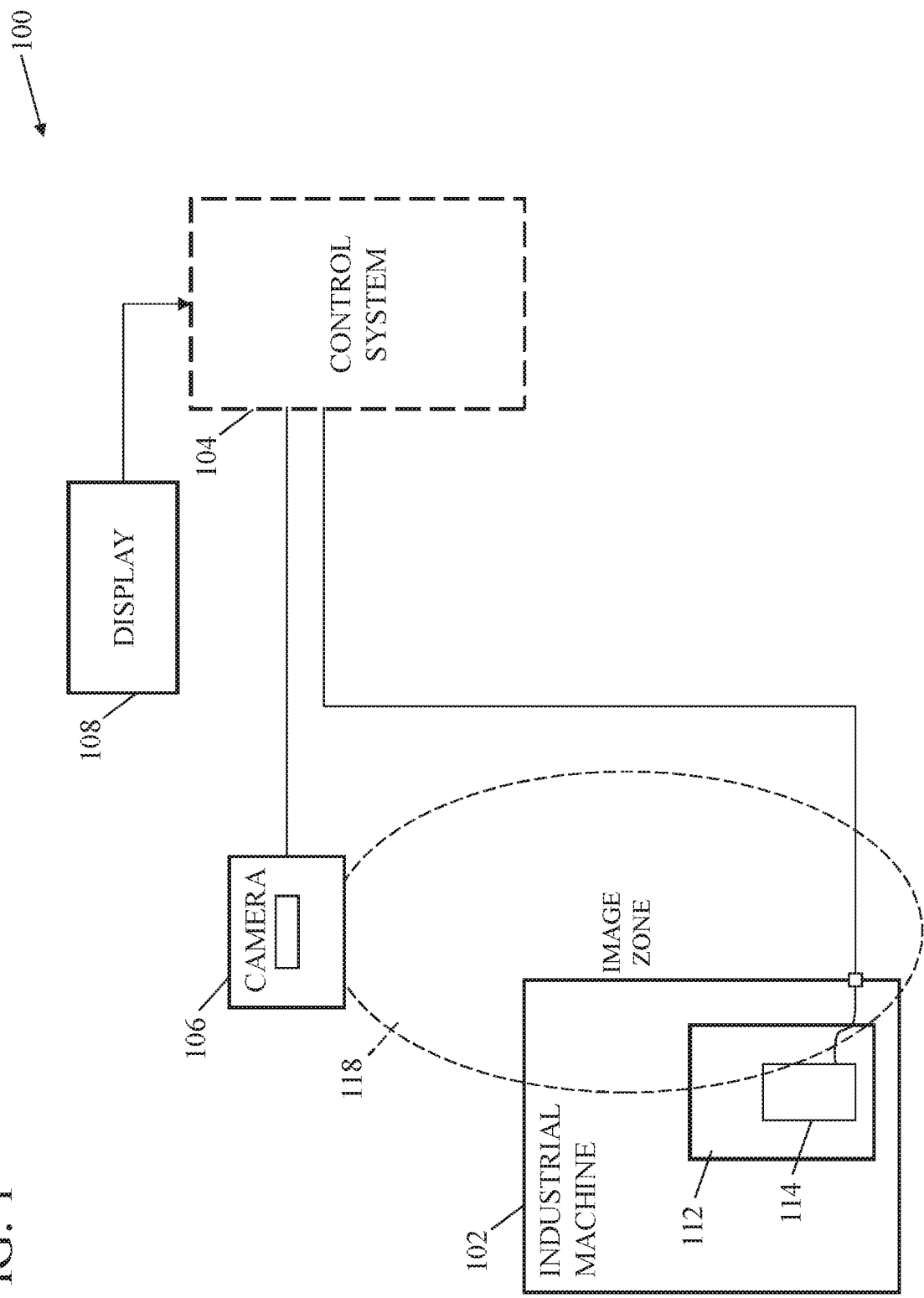
FIG. 1 is a block diagram of an exemplary system for operation of an industrial machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "halting" and "controlling" include stopping, partially stopping, slowing, backing up, or otherwise placing an industrial machine in a safe operating condition.

Although the system, method, and article of manufacture described herein are described with respect to a metal working machine, such as a press brake, the system, method, and article of manufacture are applicable to any type of operator controlled or monitored machine in which it is desirable to ensure the safety of the operator and/or in which monitoring operations are desirable.

Accordingly, embodiments of the present disclosure relate to a system, method, and article of manufacture for operation of an industrial machine and, more particularly, to a system, method, and article of manufacture for monitoring and controlling (e.g., halting) operation of an industrial machine in which an image zone is defined with respect to the industrial machine and in which the image zone is monitored for the presence of a predefined color, pattern, and/or shape. To this end, and as described in greater detail below, the systems, methods, and articles of manufacture described herein utilize a programmable image zone, which may be implemented as part of an image recognition and analysis process, that is configured to differentiate between material and parts of an operator's body based upon various colors, patterns, shapes, and the like.

By way of example and not of limitation, the systems, methods, and articles of manufacture described herein may be implemented to improve the operational safety of an industrial machine, such as a press brake, to meet all of the operator distance safety requirements in a custom brake metal shop in which the press brake operates. For instance, user specifications may be selected to raise an upper ram of the press brake if an image sensor, such as a camera, detects the presence of at least one pixel in image data collected by the image sensor of a predefined color, such as the color green. The systems, methods, and articles of manufacture described herein may also be implemented to monitor the operation of the industrial machine. For example, where the industrial machine is a press brake, a number of press brake cycles may be monitored and/or detected, such that an operating efficiency of the press brake may be determined.

Although we have described the systems and methods herein being used with a press brake machine, it should be understood that the systems and methods described herein could be used with any machine that requires the operator to operate it at a safe distance. For example, the systems and methods described herein could be used with a drill press, a grinding machine, and the like.

FIG. 1 is a block diagram of an exemplary system 100 for operation of an industrial machine 102. Broadly, system 100 includes a control system 104, an imaging device 106, and a client device 108. System 100 receives power, in the exemplary embodiment, from a DC power supply of industrial machine 102, such as through a 5 volt or 12 volt output of industrial machine 102.

Industrial machine 102 is any industrial machine in which it is desirable or necessary to monitor and/or protect the safety of an operator (not shown) of machine 102. For example, in the exemplary embodiment, industrial machine 102 is a press brake for working sheet metal. However, in other embodiments, industrial machine 102 is another metal working machine, such as a drill press, or any woodworking or other materials working machine.

Industrial machine 102 includes a control box 112 and a switch 114 coupled to, controlled by, and/or housed within control box 112. Control box 112 houses electrical components, such as one or more processors, one or more tangible, non-transitory, computer-readable storage media, one or more power supplies, and the like for the control of industrial machine 102.

Switch 114 is any switch capable of halting operation of industrial machine 102. For example, switch 114 is a three input, three port, or three lug switch, which may permit an "always open" or "always closed" connection between electrical components. A dual in-line contact member (not shown) is, in some embodiments, coupled to switch 114. As described herein, switch 114 is coupled to processor 202 as well as to industrial machine 102 and/or control box 112. In some embodiments, control box 112 may house control system 104.

Imaging device 106 is any camera or image capture device capable of collecting real time image data. For example, imaging device 106 is any digital camera, such as any CCD or CMOS camera. Imaging device 106 is communicatively coupled to processor 202 and transmits image data to processor 202 for analysis.

Imaging device 106 is further located in proximity to industrial machine 102 and oriented to collect image data within an image area or image zone 118. Image zone 118 may define a safety zone or "smart field" about industrial machine 102. As described herein, image zone 118 is reconfigurable on the fly and may be adjusted based upon any of a variety of factors, such as, for example, the particular industrial machine 102 to be monitored, one or more colors, patterns, and/or shapes to be identified, an area around industrial machine 102 to be monitored, and the like. Further, image zone 118 may include a face of industrial machine 102 and may extend any desired distance therefrom, such as, for example, approximately six inches therefrom. In some embodiments, image zone 118 may include any area around industrial machine 102, any area in proximity or close proximity to industrial machine 102, any area surrounding industrial machine 102, and the like. Imaging device 106 may thus monitor image zone 118.

Client device 108 is any suitable device capable of displaying operational data associated with industrial machine 102 and/or receiving control instructions for industrial machine 102. For example, client device 108 may be any computing device, such as any standalone computing device, personal computing device, or tablet computing device, any plasma display, any LED display, and CRT display, any OLED display, and the like. Client device 108 is communicatively coupled to control system 104, such as by a wireless (e.g., BLUETOOTH, WIFI, and the like) connection and/or and wired (e.g., USB, RS232, and the like) connection.

Figure 2:
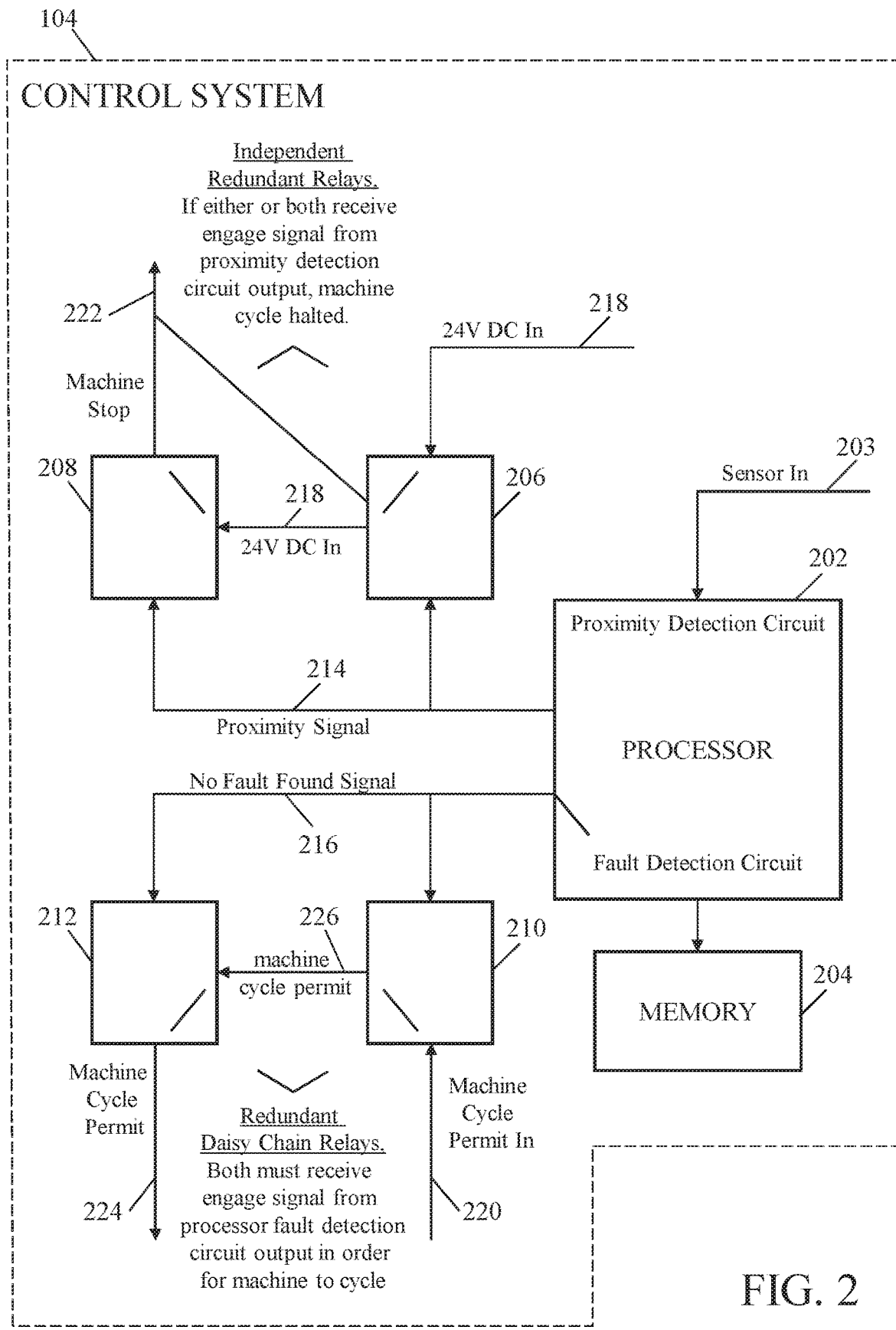
FIG. 2 is a block diagram of an exemplary control system of the system shown at FIG. 1.

FIG. 2 is a block diagram of control system 104. In general, control system 104 includes at least one processor 202, such as at least one computer processor, controller, or logic unit, and a tangible, non-transitory computer-readable storage medium or memory 204. Memory 204 includes any type of RAM or ROM, any solid state memory, any spinning hard drive, any optical computer-readable media, such as a CD or DVD, and the like. Processor 202 is communicatively coupled to memory 204. Memory 204 further includes computer-readable instructions that, when executed by processor 202, cause processor 202 to perform operations, as described herein, for operation of industrial machine 102, such as operations for halting and/or monitoring industrial machine 102.

Processor 202 is also communicatively coupled to imaging device 106, such as by one or more wired or wireless connections, and receives an imaging device signal 203 from imaging device 106. In various embodiments, imaging device signal 203 is any signal output by imaging device 106, such as, for example (and as described below), a signal indicating that imaging device 106 has detected the presence of one or more specified colors, patterns, and/or shapes in image zone 118 monitored by imaging device 106 and/or a self-check or no fault found signal (as described below) provided by imaging device 106.

Control system 104 also includes a plurality of relay modules, such as a first relay module 206, a second relay module 208, a third relay module 210, and a fourth relay module 212. In the exemplary embodiment, relay modules 206-212 are any suitable device for electrically isolating one portion of a circuit from another portion of the circuit or from another circuit, such as any relay, any low level trigger optocoupler, any optical isolator, any photocoupler, and the like. In some embodiments, relay modules 206-212 may electrically isolate processor 202 from industrial machine 102.

In addition, first relay module 206 may be coupled to or cascaded with second relay module 208, such that second relay module 208 functions as a redundant relay to first relay module 206. Similarly, third relay module 210 may be coupled to or cascaded with fourth relay module 212, such that fourth relay module 210 functions as a redundant relay to third relay module 208. In addition, in some embodiments, control system 104 only includes first relay module 206 and third relay module 210 and excludes redundant or backup relay modules. In other embodiments, control system 104 includes additional levels of relay redundancy, such as triple redundant relays or even quadruple redundant relays.

In the exemplary embodiment, first relay module 206 and second relay module 208 are coupled to processor 202, such as by one or more wired or wireless connections between first relay module 206, second relay module 208, and processor 202. First relay module 206 and second relay module 208 may also be coupled to one another, such as, for example, by one or more wired or wireless connections.

Similarly, third relay module 210 and fourth relay module 212 are coupled to processor 202, such as by one or more wired or wireless connections between third relay module 210, fourth relay module 212, and processor 202. Third relay module 210 and fourth relay module 212 may also be coupled to one another, such as, for example, by one or more wired or wireless connections.

Thus, processor 202 may communicate a signal, such as a proximity signal 214, to one or both of first relay module 206 and/or second relay module 208. Likewise, processor 202 may communicate a signal, such as a no fault found signal 216, to one or both of third relay module 210 and/or fourth relay module 212.

In the exemplary embodiment, first relay module 206 may also receive an input voltage signal 218, such as a 24 volt DC input voltage signal. As shown, first relay module 206 may transmit or pass input voltage signal 218 to second relay module 208. In an alternative embodiment, second relay module 208 receives input voltage signal 218 directly and does not receive input voltage signal 218 from first relay module 206.

In addition, third relay module 210 may receive a machine cycle permit in signal 220, which may be provided by industrial machine 102, and more particularly, by control box 112 of industrial machine 102. As shown, third relay module 210 may output machine cycle permit in signal 220 for transmission to fourth relay module 212. In an alternative embodiment, fourth relay module 212 receives machine cycle permit in signal 220 directly and does not receive machine cycle permit in signal 220 from third relay module 210.

Thus, first relay module 206 and second relay module 208 each receive input voltage signal 218 and proximity signal 214. Similarly, third relay module 210 and fourth relay module 212 each receive machine cycle permit in signal 220 and no fault found signal 216.

In the exemplary embodiment, and as described in greater detail below, second relay module 208 may generate a machine stop signal 222, and fourth relay module 212 may generate a machine cycle permit out signal 224. One or both of machine stop signal 222 and/or machine cycle permit out signal 224 may be communicated (e.g., over a wired or wireless connection) to control box 112 of industrial machine 102 for controlling operation of industrial machine 102. For example, machine stop signal 222 may be communicated to control box 112 and/or switch 114 to halt operation of industrial machine 102, and machine cycle permit out signal 224 may be provided to control box 112 and/or switch 114 to permit or allow operation of industrial machine 102.

Control system 104 may be installed in industrial machine 102 during manufacture and/or retrofitted with industrial machine 102. In either instance, control system 104 may be spliced into the control circuitry of industrial machine 102. More particularly, industrial machine 102 may include a machine cycle permit wire (not shown), which may be included with industrial machine 102 to allow industrial machine to operate or cycle in response to machine cycle permit in signal 220, which may be provided by a processor or control circuit within control box 112. Similarly, industrial machine 102 may include a machine stop wire (not shown), which may be included with industrial machine 102 to halt industrial machine in response to machine stop signal 222.

Control system 104 may be spliced into the control circuitry of industrial machine 102, such that machine cycle permit in signal 220 is intercepted and provided to third relay module 210, and such that machine stop signal 222 is provided by one or both of first relay module 206 and/or second relay module 208. In some embodiments, control box 112 is also able to provide machine stop signal 222, such as, for example, in response to an action taken by an operator of industrial machine 102. Such an action might be activation of a machine stop button (not shown) on industrial machine 102 by the operator in response to an unsafe condition and/or prior to leaving industrial machine 102, such as, for example, for a break and/or at the end of the operator's shift.

Figure 3:
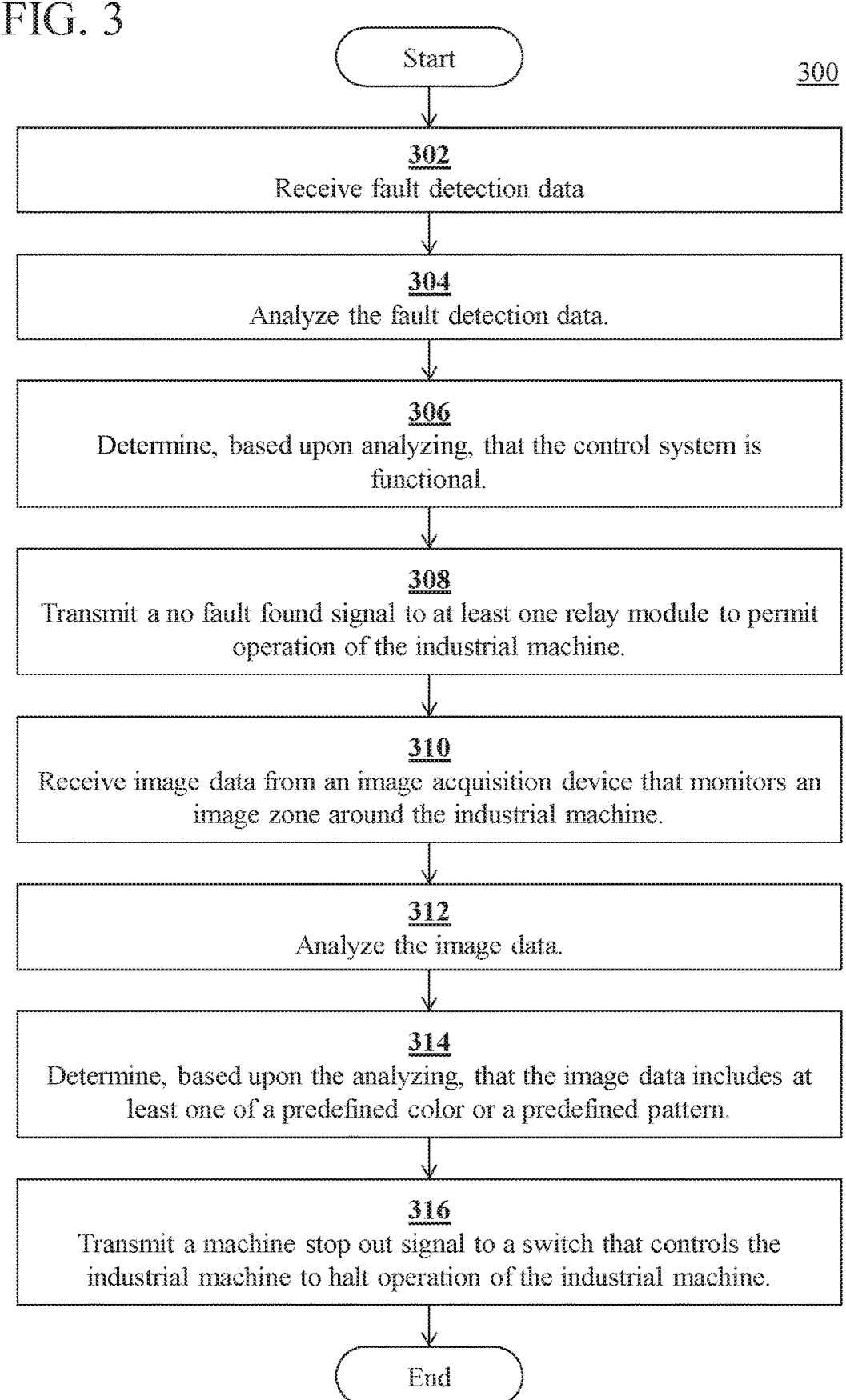
FIG. 3 is a flowchart illustrating an exemplary process for operation of an industrial machine using the system shown at FIG. 1.

FIG. 3 is a flowchart illustrating an exemplary process 300 for operation of industrial machine 100. Accordingly, in the exemplary embodiment, processor 202 receives fault detection data, such as fault detection data from imaging device 106 and/or fault detection data generated internally by processor 202 (step 302). For instance, processor 202 may generate fault detection data indicating that processor 202 includes a short circuit and/or that software to be executed by processor 202 for operation of industrial machine 102 is not loaded or running. Similarly, fault detection data from imaging device 106 may indicate that imaging device 106 is not functioning properly or is not powered on.

Processor 202 analyzes the fault detection data (step 304) to determine whether control system 104 is functional and/or functioning properly (step 306). In the exemplary embodiment, if fault detection data is received by processor 202, processor 202 may determine that a fault has occurred somewhere within control system 104 and/or within imaging device 106. However, if processor 202 does not receive any fault detection data, processor 202 may determine that control system 104 and/or imaging device 106 are functional and/or functioning properly.

If processor 202 determines that control system 104 and/or imaging device 106 are functional and/or functioning properly, control system 104 may generate and transmit no fault found signal 216 to at least one relay module, such as third relay module 210 and/or fourth relay module 212 (step 308). In the exemplary embodiment, processor 202 transmits no fault found signal 216 to both of third relay module 210 and fourth relay module 212. However, in other embodiments, only one of third relay module 210 and/or fourth relay module 212 receive no fault found signal 216.

In addition, and as described above, third relay module 210 may be coupled to fourth relay module 212, which may, in turn, be coupled to switch 114 of control box 112 (e.g., via a machine permit cycle wire). Third relay module 210 may receive no fault found signal 216 and machine cycle permit in signal 220, and may, in response to receipt of both signals 216 and 220, close, such that machine cycle permit in signal 220 is output by third relay module 210 to fourth relay module 212. Fourth relay module 212 may thus receive machine cycle permit in signal 220 from third relay module 210 as well as no fault found signal 216 from processor 202.

In response to receipt of both machine cycle permit in signal 220 from third relay module 210 and no fault found signal 216 from processor 202, fourth relay module 212 may output machine cycle permit out signal 224, which may be transmitted (e.g., over the machine cycle permit wire) to switch 114 of control box 112. When switch 114 receives machine cycle permit out signal 224, switch 114 may close, such that industrial machine 102 is permitted or allowed to operate. If machine cycle permit out signal 224 is not provided to switch 114, switch 114 may remain open, and industrial machine may not be allowed to operate. In another embodiment, switch 114 may open, rather than close, in response to machine cycle permit out signal 224. Such an embodiment would require that industrial machine 102 operate based upon the absence of machine cycle permit out signal 224. However, such embodiments are contemplated and within the scope of this disclosure.

Thus, industrial machine 102 may be prevented from functioning by control system 104 until two conditions are met. First, no fault found signal 216 must be generated by processor 202, and second, machine cycle permit in signal 220 must be received by third relay module 210. In this manner, industrial machine 102 is prevented from operating until stringent safety requirements are met.

To halt operation of industrial machine 102, as described above, imaging device 106 monitors zone 118 to acquire real time (or pseudo real time) image data for zone 118. The real time image data may include one or more images of image zone 118. Each image is transmitted by imaging device 106 to processor 202, which receives the image data (step 310).

Processor 202 analyzes the image data (step 312) to determine whether the image data includes at least one of a predefined color, a predefined pattern, and/or a predefined shape (step 314). For example, the machine operator may, in the exemplary embodiment, wear a colored glove (not shown) or a glove that is marked with one or more predefined colors, such as the color green. In other words, the glove may be wholly covered in a particular color or may include markers or areas over which one or more colors are spread. Processor 202 may execute one or more image recognition processes or algorithms for this purpose, which may be stored as software instructions in memory 204.

As the glove of the operator enters zone 118, imaging device 106 may capture and transmit one or more images of the glove, including the predefined color of the glove or of one or more areas on the glove, to processor 202. In response, processor 202 analyzes the image data provided by imaging device 106, identifies the presence of the predetermined color in the image data, and generates and transmits proximity signal 214 to first relay module 206 and second relay module 208 (step 316). In one embodiment, processor 202 generates and transmits proximity signal 214 if even a single pixel in the image data corresponds to the predefined color.

In the exemplary embodiment, processor 202 also analyzes the image data to determine whether the image data includes a predefined pattern and/or shape. More particularly, processor 202 analyzes each of a plurality of pixels comprising the image as part of a pattern or shape recognition process to identify a pattern or shape, such as a pattern or shape corresponding to an object or object image (e.g, an appendage of the operator) in the image data. In response to detecting a pattern and/or shape in the image data, processor 202 generates and transmits proximity signal 214.

In one embodiment, processor 202 combines color recognition, as described above, with and pattern or shape recognition, as described above, such that processor 202 only generates proximity signal 214 in response to a determination by processor 202 that the image data includes both of a predefined color and a predefined pattern and/or shape.

Similarly, processor 202 may divide image data into a plurality of fields or image areas, and each area may be analyzed independently. In such an embodiment, processor 202 may, for example, generate proximity signal 214 in response to a determination that a predefined color, shape, and/or pattern is present in at least one image area but absent from at least one other image area.

In the exemplary embodiment, and as described above, proximity signal 216 is received by first relay module 206 and second relay module 208, both of which are directly coupled to switch 114 of industrial machine 102 (e.g., by a machine stop wire of industrial machine). In response to receiving proximity signal 214, first relay module 206 generates and outputs machine stop signal 222. Similarly, in response to receiving proximity signal 214, second relay module 208 generates and outputs machine stop signal 222. Thus, either or both of first relay module 206 and/or second relay module 208 are capable of generating machine stop signal 222, such that if either relay module 206 and/or 208 receives proximity signal 216 (indicating that a particular color, pattern, and/or shape, has been detected in the image data), machine stop signal 222 is provided to switch 114 of industrial machine 102.

In response to receiving machine stop signal 222, switch 114 may open or close (e.g., disconnect or connect) to halt all or part of the operations of industrial machine 102. In the exemplary embodiment, switch 114 is opened. In response, industrial machine 102 shuts down and/or shifts into an open or disengaged position, such that, in the last instance, the machine operator is able to dislodge any object, such as the workpiece or an appendage of the operator which may be stuck or trapped, from industrial machine 102.

Further, in the exemplary embodiment, either or both of the predefined color, pattern, and/or shape are configurable. For instance, computer code or instructions designating one or more colors and/or one or more patterns and/or shapes may be uploaded to memory 204 for execution by processor 202. Thus, system 100 is reconfigurable and updateable as well as sufficiently flexible for use under a variety of conditions and with a variety of industrial machines 102.

Figure 4:
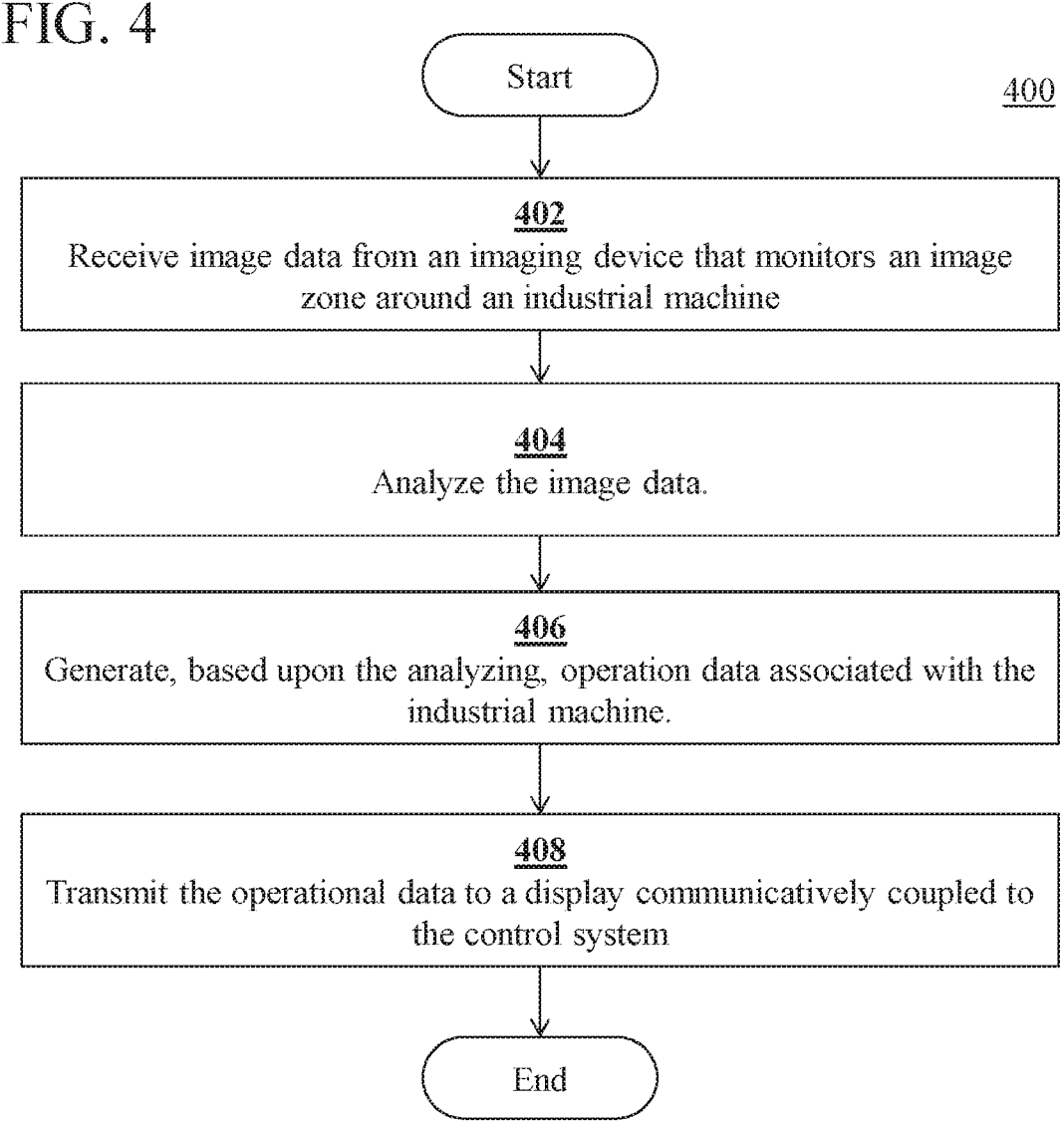
FIG. 4 is a flowchart illustrating an exemplary process for monitoring operation of an industrial machine using the system shown at FIG. 1.

FIG. 4 is a flowchart illustrating an exemplary process 400 for monitoring operation of industrial machine 400. Accordingly, in the exemplary embodiment, processor 202 receives image data from imaging device 106 (step 402). As described above, the image data may include any image data associated with industrial machine 102, such as data associated with the operation of industrial machine 102.

In the exemplary embodiment, processor 202 may further analyze the image data received from imaging device 106 (step 404). For example, processor 202 may determine a number of machine cycles of industrial machine 102 occurring within a predefined period of time (e.g., within a fifteen minute period, within a thirty minute period, within a period of one hour, during a shift worked by the operator, and the like). Similarly, processor 202 may determine a number of proximity events associated with industrial machine 102 that have occurred within a predefined period of time (e.g., within a fifteen minute period, within a thirty minute period, within a period of one hour, during a shift worked by the operator, and the like).

Based upon the analysis of the image data, processor 202 may also generate "operational data," which, as used herein, may include data associated with the operation of industrial machine 102 (step 406). For example, operational data may be associated with or one or more cycles of industrial machine 102 (e.g., machine cycles or presses of a press brake), data associated with one or more proximity events, and the like.

As used herein, a "proximity event" may be associated with generation of proximity signal 214, as described above. Thus, a proximity event may correspond to detection by processor 202 of a particular pattern, shape, or color in the image data provided by imaging device 106. Such an event may indicate, for example, that an operator of industrial machine 102 has violated a particular safety protocol, such as by inserting an appendage within image zone 118 during operation of industrial machine 102.

Thus, processor 202 may analyze the image data received from imaging device 106 to generate operational data corresponding to one or more events (e.g., proximity events, machine cycles, and the like) occurring during operation of industrial machine 102. The operational data may further be associated with or measured over any suitable period of time.

Processor 202 may further transmit the image data (e.g., in real time and/or pseudo real time) and/or operational data to client device 108 (step 408). As described above, client device 108 may be coupled via a wired and/or wireless connection to control system 104, such that processor 202 may communicate the operational data via any desirable communication mechanism. In addition, processor 202 may communicate the operational data to client device 108 in any suitable data format, such as, for example, as part of one or more spreadsheets, as part of one or more tables, as part of a textual document, as part of an image or collection of images or image filed, and/or as part of any other suitable electronic document and/or in any suitable format. Client device 108 may, in response, display the operational data for review and observation by an operator of client device 108, such as, for example, by a supervisor or manager having responsibility for the operations of one or more industrial machines 102.

In addition, client device 108 may be configured to receive one or more control instructions, such as one or more control instructions from a user or operator of client device 108. For example, where client device 108 includes a computing device, such as a tablet computing device or a mobile computing device, a user or operator may provide one or more control instructions via a user interface displayed on client device 108. These control instructions may be transmitted by client device 108 to control system 104, which may process the instructions to control industrial machine 102, such as, for example, to halt industrial machine 102, to slow industrial machine 102, to back up industrial machine 102, and the like.

Embodiments of the present disclosure relate to a system, method, and article of manufacture for operation of an industrial machine and, more particularly, to a system, method, and article of manufacture for monitoring and halting operation of an industrial machine in which an image zone is defined with respect to the industrial machine and in which the image zone is monitored for the presence of a predefined color, pattern, and/or shape. To this end, and as described in greater detail below, the systems, methods, and articles of manufacture described herein utilize a programmable "smart" field, which may be implemented as part of an image recognition and analysis process, configured to differentiate between material and parts of an operator's body based upon various colors, patterns, shapes, and the like.

Exemplary technical effects of the systems, methods, and articles of manufacture described herein include, for example: (a) image zone monitoring for image analysis and recognition of one or more predefined colors, patterns, and/or shapes within the image zone and/or image zone; (b) implementation of a plurality of redundant relays coupled to a processor for controlling a machine cycle permit out signal; (c) implementation of a plurality of redundant relays coupled to the processor for controlling a machine stop signal; (d) halting of the industrial machine in response to detection of one or more predefined colors, patterns, and/or images; (e) monitoring of the industrial machine based upon one or more image recognition processes.

Exemplary embodiments of a system, method, and article of manufacture for halting operation of an industrial machine, and related components, are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiments can be implemented and utilized in connection with many applications where industrial safety and monitoring systems are desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for operation of an industrial machine, the control system configured to be spliced into control circuitry of the industrial machine to connect the control system to the control circuitry of the industrial machine, the control system comprising:

a processor; and a tangible, non-transitory, computer-readable memory communicating with the processor, the memory having instructions stored thereon that, in response to execution by the processor, cause the processor to perform operations comprising:

dynamically configuring at least one of a shape and a size of an image zone around the industrial machine to which the control system is connected based upon one or more dimensions of the industrial machine, the image zone being sized to include a portion of the industrial machine within the image zone;

receiving image data from an imaging device that monitors the image zone around the industrial machine;

analyzing the image data;

determining that the control system is functional;

determining, based upon the analyzing, whether the image data includes at least one of a predefined color, a predefined pattern, and a predefined shape;

transmitting, in response to determining that the image data includes at least one of the predefined color, the predefined pattern, and the predefined shape, a proximity signal to at least one first relay module coupled between the processor and the industrial machine, wherein the at least one first relay module is configured to be coupled to a machine stop wire of the industrial machine to enable the at least one first relay module to halt operation of the industrial machine; and transmitting, in response to determining that the control system is functional, a no fault found signal to at least one second relay module coupled between the processor and the industrial machine, wherein the at least one second relay module is configured to intercept a machine cycle permit wire of the industrial machine.

2. The control system of claim 1, wherein halting operation of the industrial machine comprises at least one of stopping, partially stopping, slowing, backing up, and placing the industrial machine in a safe operating condition.

3. The control system of claim 1, wherein the processor performs operations further comprising determining that a plurality of pixels comprising the image data include at least one pixel of the predefined color, and transmitting the proximity signal in response to halt operation of the industrial machine.

4. The control system of claim 3, wherein the predefined color is green.

5. The control system of claim 1, wherein the processor performs operations further comprising dynamically configuring at least one of the predefined color, the predefined pattern, and the predefined shape.

6. The control system of claim 1, wherein the processor performs operations further comprising determining that a plurality of pixels comprising the image data are associated with the predefined shape and the predefined color.

7. The control system of claim 6, wherein the predefined shape and the predefined color are associated with a glove worn by an operator of the industrial machine.

8. A control system for operation of an industrial machine, the control system configured to be connected to control circuitry of the industrial machine to connect the control system to the control circuitry of the industrial machine, the control system comprising:
   a processor; and
   a tangible, non-transitory, computer-readable memory communicating with the processor, the memory having instructions stored thereon that, in response to execution by the processor, cause the processor to perform operations comprising:
      receiving fault detection data indicating whether at least one of the processor and an imaging device that monitors an image zone around the industrial machine is functioning properly;
      analyzing the fault detection data;
      determining, based upon the analyzing, that the control system is functional;
      transmitting, in response to determining that the control system is functional, a no fault found signal to at least one relay module of a plurality of relay modules to permit operation of the industrial machine, wherein the at least one relay module is coupled between the processor and the industrial machine and configured to intercept a machine cycle permit wire of the industrial machine;
      dynamically configuring at least one of a shape and a size of the image zone around the industrial machine to which the control system is connected based upon one or more dimensions of the industrial machine, the image zone being sized to include a portion of the industrial machine within the image zone;
      receiving image data from the imaging device; and
      controlling, based upon the image data, the industrial machine, wherein said controlling comprises transmitting a proximity signal to at least one additional relay module of the plurality of relay modules coupled to a machine stop wire of the industrial machine to halt operation of the industrial machine.

9. The control system of claim 8, wherein the no fault found signal indicates that no fault has been detected in the control system.

10. The control system of claim 8, wherein the fault detection data is received from at least one of the imaging device and the processor.

11. The control system of claim 8, wherein the processor performs operations further comprising transmitting the no fault found signal to a plurality of cascaded relay modules, wherein each relay module of the plurality of cascaded relay modules are configured to close in response to the no fault found signal.

12. The control system of claim 11, wherein one relay module of the plurality of cascaded relay modules is configured to generate a machine cycle permit out signal in response to the no fault found signal.

13. The control system of claim 12, wherein the one relay module of the plurality of relay modules is further configured to generate the machine cycle permit out signal in response to a machine cycle permit in signal received from another relay module of the plurality of cascaded relay modules.

14. The control system of claim 13, wherein the another relay module of the plurality of relay modules is configured to receive the machine cycle permit in signal from the industrial machine.

15. A control system for operation of an industrial machine, the control system configured to be spliced into control circuitry of the industrial machine to connect the control system to the control circuitry of the industrial machine, the control system comprising:
   a processor; and
   a tangible, non-transitory, computer-readable memory communicating with the processor, the memory having instructions stored thereon that, in response to execution by the processor, cause the processor to perform operations comprising:
      receiving fault detection data indicating whether at least one of the processor and an imaging device that monitors an image zone around the industrial machine is functioning properly;
      analyzing the fault detection data;
      determining, based upon the analyzing, that the control system is functional;
      transmitting, in response to determining that the control system is functional, a no fault found signal to at least one first relay module coupled between the processor and the industrial machine, wherein the at least one first relay module is configured to intercept a machine cycle permit wire of the industrial machine;
      receiving image data from the imaging device;
      analyzing the image data;
      determining, based upon the analyzing, whether the image data includes at least one of a predefined color and a predefined shape; and
      transmitting, in response to determining that the image data includes at least one of the predefined color and the predefined shape, a proximity signal to at least one second relay module coupled between the processor and the industrial machine, wherein the at least one second relay module is configured to be coupled to a machine stop wire of the industrial machine to enable the at least one second relay module to halt operation of the industrial machine.

* * * * *